United States Patent [19]

Dashner

[11] 4,036,250
[45] July 19, 1977

[54] BLOW-DOWN SAFETY VALVE

[75] Inventor: James W. Dashner, Charlotte, N.C.

[73] Assignee: Consolidated Valve Industries, Inc., Matthews, N.C.

[21] Appl. No.: 655,068

[22] Filed: Feb. 4, 1976

[51] Int. Cl.² .......................................... F16K 37/00
[52] U.S. Cl. .................................... 137/476; 137/478
[58] Field of Search ............................... 137/476, 478

[56] References Cited

U.S. PATENT DOCUMENTS

| 889,895 | 6/1908 | Blanchard | 137/478 X |
| 1,032,482 | 7/1912 | Jerauld | 137/478 X |
| 2,799,291 | 7/1957 | Orr | 137/478 |
| 3,543,777 | 12/1970 | Howes | 137/478 X |
| 3,945,607 | 3/1976 | Dashner | 137/476 X |

Primary Examiner—Harold W. Weakley

[57] ABSTRACT

A blow-down safety valve having means for directing the fluids exiting therefrom along a flow path which assists the valve member to open and seat quickly without excessive bleeding. The valve member includes a flat seating portion and an annular lip extending perpendicularly thereto to change the direction of the exiting fluid flow and direct it downwardly along the exterior wall of the valve inlet conduit, and a blow-down ring is provided to form an annular huddling chamber for receiving and collecting such downwardly directed fluid. The annular huddling chamber includes a bottom wall beneath the valve member annular lip and a side wall extending upwardly from the bottom wall toward and beyond the annular lip and in spaced relation thereto for directing fluid flow from the annular huddling chamber along a path substantially opposite to the direction of fluid flow into the huddling chamber.

11 Claims, 3 Drawing Figures

BLOW-DOWN SAFETY VALVE

BACKGROUND OF THE INVENTION

In fluid systems utilizing pressurized fluids, such as high-temperature gaseous fluids, it is common practice to include one or more blow-down safety valves which are placed at predetermined locations in the system for the purpose of preventing the pressure of the fluid in the system from exceeding a predetermined maximum limit. These safety valves generally include an inlet conduit communicating with the fluid system and forming a valve seat, and a valve member biased into a seated position by a spring or the like that is preset to permit the normally seated valve member to move to an open positon when the pressrue in the fluid system, acting against the valve member, reaches a predetermined maximum limit, thereby relieving the pressure in the fluid system to prevent such pressure from exceeding the predetermined maximum limit. A typical blow-down safety valve of this sort is disclosed in co-pending U.S. Application Ser. No. 521,975, filed Nov. 8, 1974.

It is recognized that as the system pressure approaches this predetermined maximum limit, the opposite forces (e.g. the spring and the fluid pressure) acting against the valve member approach a balance, and the valve member then has a tendency to permit excessive bleeding at the valve seat, which, in some instances, may begin prior to the system pressure reaching the aforesaid maximum pressure limit. This excessive and/or premature bleeding can cause irregular operation of the valve and may result in the system pressure exceeding its predetermined maximum pressure limit without the valve member opening to its fully opened position.

Accordingly, it is highly desirable in blow-down safety valves of the type in question to have the valve member open sharply and fully when the predetermined maximum pressure is reached in the fluid system, and eliminate or reduce the aforementioned tendency of the valve member to permit excessive bleeding of the fluid when such maximum pressure is approached. Similarly, and for the same reasons, it is also highly desirable to have the valve member close sharply and fully when the fluid pressure drops below a predetermined minimum fluid pressure.

Numerous attempts have heretofore been made to design valves with particular features designed to increase the sharpness with which the valve member opens and closes, as, for example, U.S. Pat. No. 3,354,900 to Ferrill which discloses a valve having a huddling chamber formed with an outlet passage that is gradually reduced as the valve member beings to open and is gradually increased as the valve member closes. Moreover, in U.S. Pat. No. 3,027,912 to Carr a huddling chamber is provided to assist in raising the valve member, and in U.S. Pat. No. 3,411,530 to Powell a lip is located on the valve to direct exiting fluids downwardly while a restricted passageway is provided around the valve member to cause a pressure imbalance thereacross when the valve member first opens. Finally, in U.S. Pat. No. 3,757,815 to Orr, the seating surface of the valve member is formed with recesses that create turbulence in the exiting gases to thereby increase the pressure exerted against the valve member by the exiting gases when the valve member first opens.

In accordance with the present invention, a particular huddling chamber and fluid directing means are provided for simultaneously creating turbulence in the exiting fluid and initially restricting the passage of exiting fluid from the huddling chamber to cause a sharp opening and closing of the valve member.

SUMMARY OF THE INVENTION

Briefly described, the present invention provides a blow-down safety valve for use with elevated temperature fluid systems and the like, such safety valve being disigned to direct and collect the fluid exiting from the valve in a particular manner so that the valve member will open and close sharply at predetermined pressure levels in the fluid system.

The safety valve of the present invention includes a casing having an inlet conduit presenting a generally annular valve seat, and a valve member which has a generally flat seating portion and which is arranged for selective movement between an open position spaced from the valve seat and a closed position at which the seating portion thereof abuts the valve seat of the inlet conduit. The valve member is formed with fluid directing means extending from the seating portion thereof at a location beyond the peripheral extend of the inlet conduit for deflecting the flow path of the fluid from a first direction extending along the seating portion to a second direction extending substantially perpendicularly to the first direction. A ring member is mounted on the inlet conduit to form an annular cavity disposed in the path of the fluid flowing from the fluid directing means on the valve members to collect such fluid therein, and this annular cavity includes a side wall extending generally toward and beyond the fluid directing means in spaced relation thereto whereby the fluid will be directed from the annular cavity by the side wall thereof along a third direction extending generally opposite to the aforeside second direction.

By virtue of the aforesaid arrangement, when the valve member permits initial bleeding at a predetermined pressure in the fluid system, the fluid flowing from the inlet conduit will be deflected into the annular cavity where it will experience a certain degree of turbulence, and the fluid is directed from the annular cavity along a substantially opposite direction of flow. This altering of the flow path of the fluid and the turbulence created in the annular cavity apparently causes the fluid to exert a force on the valve member as soon as the fluid begins to bleed between the valve member and valve seat, whereupon the valve member is raised quickly and sharply to its fully open position. Moreover, when the pressure in the fluid system is reduced to a predetermined level beneath the valve opening pressure, the valve member closes quickly and sharply without any significant opposition from the exiting fluid.

In the preferred embodiment of the present invention, the fluid deflecting means associated with the valve member is in the form of an annular lip extending downwardly from the valve member seating portion in generally perpendicular relation thereto, and the annular cavity is formed between the exterior of the inlet conduit and a blow-down ring threadably mounted thereon for selective movement parallel to the axis of the inlet conduit. The annular cavity includes a flat bottom wall located in the path of the fluid flowing from the annular lip, and this bottom wall intersects the aforemensaid side wall of the annular cavity at a location substantially beneath the outermost periphery of such annular lip. Moreover, the side wall extends from the bottom wall at an angle, preferably 180°, whereby the spacing between the side wall and outermost periphery of the annular lip and the bottom wall of the cavity increases (e.g. during opening movement of the valve member), and vice versa (e.g. during closing movement of the valve member).

Additionally, the depending length of the annular lip is particularly selected in relation to the pedetermined fluid pressures at which the valve member is designed to open and close so that the turbulence imposed upon the exiting fluid is sufficient to assist in opening the valve member sharply when the predetermined maximum fluid pressure is reached and insufficient to interfere significantly with the seating of the valve member when the fluid system pressure is reduced to a predetermined minimum level.

DESCRIPTION OF THE PREFERRED EMBODIMENT

Figure 1:
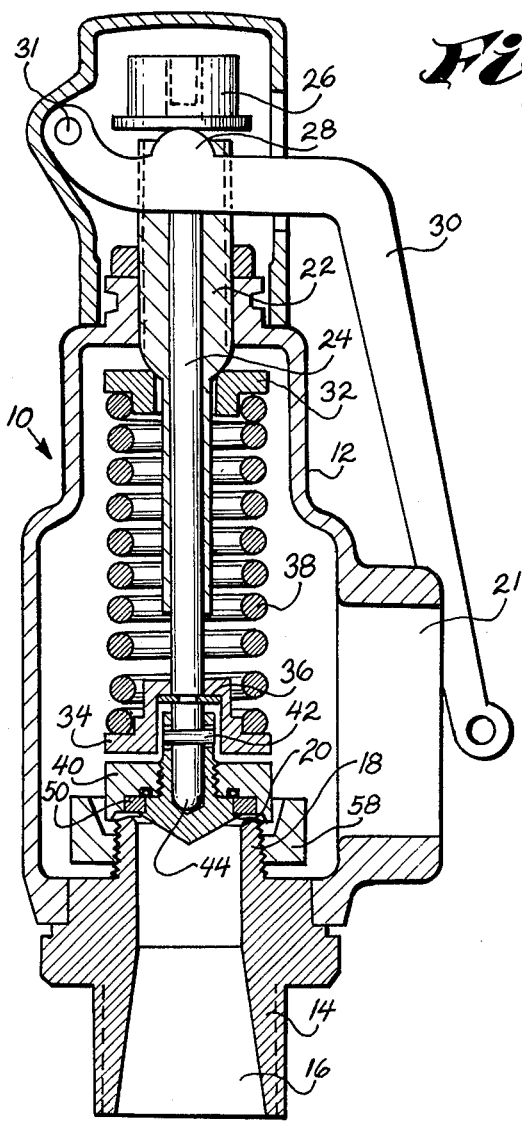
FIG. 1 is an elevation view taken through the center of a blow-down safety valve embodying the present invention.

Looking now in greater detail at the accompanying drawings, FIG. 1 illustrates a blow-down safety valve 10 of the same general type as that disclosed in greater detail in the aforementioned co-pending U.S. application Ser. No. 521,975. The safety valve 10 includes a casing 12 provided with a threaded inlet conduit 14 adapted to be fitted into an elevated temperature fluid system or the like, and this inlet conduit 14 has a central opening 16 therein and an upstanding tubular portion 18 presenting, at the end thereof, an annular valve seat 20. The safety valve 10 also includes an outlet 21 through which fluid is exhausted when the valve is opened as will be described in greater detail presently.

The upper portion of the casing 12 has threadably fitted therein a sleeve member 22 in which a valve stem 24 is slidably carried for longitudinal movement within the casing 12 in a direction parallel to the axis of the inlet conduit 14. The upper end of the valve stem 24 has a cap element 26 fixed thereto, the cap element 26 being arranged to abut a projection 28 formed on a conventional testing level 30 mounted for pivotal movement about a pivot pin 31 fixed to the casting 12. The testing lever 30 may be manually pivoted upwardly to raise the valve stem 24 for testing the operation of the safety valve 10 in a conventional manner, although the valve stem 24 moves up and down independently of the testing lever 30 during normal operation of the safety valve 10. A first spring button 32 is arranged in abutment with the sleeve member 22, and a second spring button 34 is arranged in abutment with a washer 36 attached to the lower end of the valve stem 24. A coil spring 38 is mounted between spring buttons 32 and 34 to urge the valve stem 24 in a downward direction, and it will be noted that adjustment of the position of the threaded sleeve member 22 will regulate the downward force exerted on the valve stem 24 by the coil spring 38.

Figure 2:
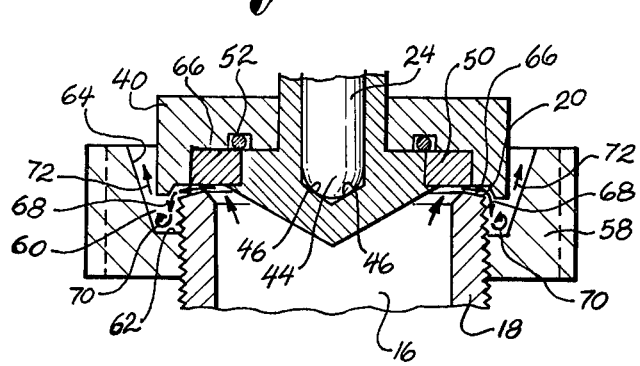
FIG. 2 is an enlarged detail view illustrating the valve member at a position slightly raised from the valve seat on the inlet conduit.
Figure 3:
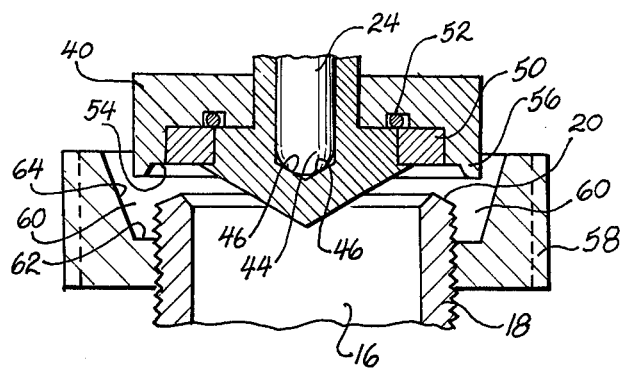
FIG. 3 is an enlarged detail view similar to FIG. 2 and illustrating the valve member at its fully open position.

A valve member 40 is mounted at the bottom end of the valve stem 24 by a pin 42, and, as best seen in FIGS. 2 and 3, the bottom end face 44 of the valve stem 24 has a spherical configuration which engages flat angular surfaces 46 formed in the valve member 40. By virtue of this arrangement, the downward force exerted by the coil spring through the valve stem 24 will be transmitted to the valve member 40 at the spherical end face 44 whereby the valve member 40 can cant slightly with respect to the valve stem 24 and cause the force of spring 38 to be equally distributed over the bottom surface of the valve member 40 when it seats on the valve seat 20. As described in greater detail in the aforementioned co-pending U.S. application Ser. No. 521,975, the valve member 40 includes an annular recess in which an annular sealing ring 50 is mounted, such annular sealing ring 50 preferably being formed of a relatively soft plastic material. An O-ring 52 is located between the annular sealing ring 50 and the valve member 40 to prevent fluid leakage therebetween. It will be noted that the bottom surface of the annular sealing ring 50 and the adjacent coplanar surface at the bottom of the valve member 40 form a generally flat seating portion 54 which abuts the valve seat 20 in sealing relation therewith when the valve member 40 is at its lowermost or seated position as shown in FIG. 1. The lower end of the valve member 40 is also formed with an annular lip 56 that depends generally perpendicularly from the flat seating portion 54 at a location beyond the peripheral extend of the valve seat 20 as best seen in FIGS. 2 and 3.

A blow-down ring member 58 is threadably mounted on the tubular portion 18 of the inlet conduit 14 whereby when the blow-down ring member 58 is rotated, it will move along the tubular portion 18 in a direction parallel to the axis of the inlet conduit 14 for selective adjustment with respect to the valve seat 20 and the valve member 40. The blow-down ring 58 forms an annular huddling chamber or cavity 60 including preferably, a flat bottom wall 62 extending in perpendicular relation to the axis of the inlet conduit 14, and a side wall 64 forming the outer wall of the annular huddling chamber 60. It will be noted that the bottom wall 62 of the huddling chamber 60 is located directly beneath the depending annular lip 56 on the valve member 40, and the side wall 64 intersects the bottom wall 62 and extends therefrom generally toward and beyond the annular lip 56 in spaced relation to the periphery thereof.

In normal operation, the saftey valve 10 is connected to a pressurized gas system and the gas in such system communicates with the safety valve 10 through its inlet conduit 14 whereby the pressure of such gas acts against the exposed bottom surface of the valve member 40 when it is seated as shown in FIG. 1. The valve member 40 is normally maintained in its seated position under the bias of coil spring 38, and, as described above, the force exerted by this spring 38 may be selectively adjusted. The spring 38 is normally preset to maintain the valve member 40 in its seated position until the pressure of the gas acting against the exposed surface area at the bottom surface of the valve member 40 reaches a predetermined maximum limit (e.g. 100 psi).

As the system gas pressure approaches this predetermined maximum limit, the opposite forces acting on the valve member approach a balance, and, in the absence of some means for causing the valve member to open quickly and sharply, the valve member will have a tendency to open very slightly and permit gas to bleed between the valve set and sealing surface portion of the valve member. Because the opposite forces acting on the valve member are nearly in balance, the valve member may tend to fluctuate between a closed or seated position and a slightly open position with excessive intermittent bleeding of the gas from the valve rather than opening sharply to its fully open position as is desired in these safety valves.

However, in accordance with the novel features of the present invention, as the gas system pressure approaches the aforesaid predetermined maximum limit and the contact stress between the valve member seating surface 54 and the valve seat 20 is reduced to a point which will premit gas to bleed therebetween (shown in FIG. 2 with the opening between valve member 40 and valve seat 20 slightly exaggerated to better illustrate the gas flow), this bleeding gas is controlled in a way which causes the exiting gas to impose an additional lifting force on the valve member 40 so that it moves sharply to its fully open position (FIG. 3). More specifically, as best seen in FIG. 2, when the valve is in a condition at which bleeding commences, the gas in inlet conduit 14 first flows between the valve seat 20 and the flat bottom sealing surface portion 54 of the valve member 40 in a first direction or flow path portion that is generally parallel to the surface 54 as indicated by the flow direction arrows 66 in FIG. 2. This gas then reaches the annular lip 56 depending from the surface 54 and is deflected thereby so that the flow path is altered to a downward directed that is substantially perpendicular to the first direction as indicated by the flow arrows 68 in FIG. 2. It will be seen that the fluid flowing in this second direction collects in the huddling chamber 60 and is directed against the bottom wall 62 of the annular huddling chamber 60 which causes a certain degree of turbulence in fluid as indicated by the flow arrows 70, after which the fluid flows from the huddling chamber 60 between the side wall 64 thereof and the outer periphery of the annular lip 56 in a third direction, indicated by flow arrows 72, that is substantially opposite to the aforesaid second direction of flow.

It is believed that the substantial changes of direction imposed upon the exiting fluid by the annular lip 56 and walls 62, 64 of the annular huddling chamber 60, combined with the inherent turbulence created in the huddling chamber prior to its exiting between the side wall 64 and the annular lip 56, causes the exiting fluid to build up pressure in the huddling chamber 60 that acts along the bottom surface of the valve member 40 to impose an upwardly force thereon which lifts the valve member 40 sharply to its fully open position as shown in FIG. 3. It has been found in actual practive that a safety valve 10 made in the manner described above will consistently open sharply and qucikly to its fully open position when the fluid pressure in the system reaches the aforesaid predetermined maximum limit. Moreover, when the valve member 40 is positioned at its raised or open position as shown in FIG. 3, and pressure in the fluid system has been relieved through the open valve sufficiently to reduce the pressure to a predetermined minimum valve (e.g. 96 psi), the force of the spring 38 will act to move the valve member 40 downwardly to its closed or seated position with substantially no interference from the exiting fluid passing between the valve member 40 and valve set 20. it is to be noted in this regard that the flow characteristics described above in connection with FIG. 2 will occur only at the very end of the closing movement of the valve member 40 which will, at this point, have built up momentum in a downward direction, and the fluid pressure in the system will be reduced from the aforesaid predetermined maximum value to the aforesaid minimum value.

In the preferred embodiment of the present invention, the side wall 64 intersects the bottom wall 62 at a location substantially beneath the outermost peripheral edge of the annular lip 56, and extends upwardly therefrom at an angle directed away from such outermost peripheral edge whereby the spacing between the side wall 64 and the periphery of the annular lip 56 increases as the spacing between the annular lip 56 and the bottom wall 62 increases as the valve member 40 moves to its fully open position. With the side wall 64 having such an angular extend, it will be noted that the restriction imposed on the fluid exiting from the huddling chamber 60 is smallest when the valve member 40 first opens whereby a greater lifting force is imposed on the valve member 40. Moreover, as the valve member 40 begins to move downwardly from its open position, the restriction is relatively large so that no significant upward force is imposed on the valve member 40 as it starts its closing direction. Finally, with this inclined side wall 64, the desired minimum restriction between the annular lip and side wall 64 may be set by rotating the blow-down ring 58 to adjust its position on the inlet conduit 14 as described above, and this adjustment of the blow-down ring 58 also controls the volume of the huddling chamber 60 between the bottom wall 62 and the valve member 40. It has been found that particularly good results are obtained in all of the above-noted respects if the side wall 64 extends from its intersection with the bottom wall 62 at an angle of 108° with respect thereto.

It has also been found that the depending extend of the annular lip 56 beneath the valve member sealing surface 54 should be conversely proportional to the predetermined maximum pressure limit at which the valve is designed to open. if the depending extend of the annular lip 56, at a particular predetermined opening pressure, is too short, the aforementioned turbulence imposed on the exiting gas bleeding from the valve may be reduced to a point where a sharp opening of the valve member 40 will not be obtained when this bleeding commences. On the other hand, if the depending extent of the annular lip 56 is too long, too much turbulence may be imposed upon the exiting gas at the end of the movement of the valve member 40 from its fully open position (FIG. 3) to its seated position when the system pressure is reduced to a predetermined minimum, whereby the valve member 40 may not seat quickly and sharply. It has been found, for example, that in a 1 1/2-inch valve size, optimum valve member opening and closing results are obtained when the following relationship exists between the predetermined valve opening pressure and the depending extend of the annular lip 56:

| Opening Pressure | Depending Extent |
|---|---|
| 85 psi | .112 inch |
| 120 psi | .097 inch |
| 165 psi | .083 inch |

Thus, it will be seen that the depending extent or length of the annular lip 56 is selected in relation to the maximum fluid system pressure so that the turbulence imposed upon the exiting gas thereby is sufficient to assist in causing the valve member 40 to open sharply to its fully open position, yet such turbulence is insufficient to interfere significantly with the closing or seating of the valve member 40 when the fluid system pressure is reduced to a predetermined minimum level at which the valve member 40 is designed to close.

The present invention has been described in detail above for purpose of illustration only and is not intended to be limited by this description or otherwise to exclude any variation or equivalent arrangement that would be apparent from, or reasonably suggested by, the foregoing disclosure to the skill of the art.

I claim:

1. A blow-down safety valve for use with elevated temperature fluid systems and the like to open when the pressure in said fluid system reaches a predetermined maximum level, said valve including a casing formed with an inlet conduit presenting a generally annular valve seat, a valve member selectively movable between a position seated on said valve seat, and an open positon spaced therefrom, said valve member including a generally flat seating portion for selective abutment with said annular valve seat and a fluid deflecting portion depending generally perpendicularly from said flat seating portion at a location beyond the peripheral extend of said valve seat whereby when said valve member initially permits gas to bleed at said valve seat fluid will flow along a first direction extending generally parallel to said valve seat and then be deflected by said fluid deflecting portion to a second direction substantially perpendicular to said first direction, and a blow-down ring mounted about said inlet conduit adjacent said valve seat thereof, said blow-down ring forming an annular cavity including a bottom wall in said blow-down ring located directly beneath said fluid deflecting portion of said valve member and including a side wall extending from said bottom wall generally toward and beyond said fluid deflecting portion in spaced relation thereto whereby fluid flowing in said second direction will collect in said cavity and be directed therefrom by said side wall in a third direction extending generally opposite to said second direction.

2. a safety valve as defined in claim 1 and further characterized in that said blow-down ring is mounted on said valve inlet conduit for selective movement therealong toward and away from said valve member whereby the spacing between the end of said fluid deflecting portion and said bottom wall of said blow-down ring cavity can be selectively adjusted.

3. A safety valve as defined in claim 2 and further characterized in that said side wall of said blow-down ring cavity intersects said bottom wall thereof at a point substantially beneath the outermost peripheral edge of said valve member fluid deflecting portion, and in that said side wall extends from said bottom wall at an angle directed away from said outermost peripheral edge whereby the spacing between said side wall and said outermost peripheral edge increases as the spacing between said fluid deflectng portion and said cavity bottom wall increases.

4. A safety valve as defined in claim 1 and further characterized in that the depending extent of said fluid deflecting portion from said generally flat valve member seating portion is selected in relation to said maximum fluid system pressure so that the turbulence imposed upon said fluid thereby is sufficient to assist in opening said valve member sharply when said maximum fluid pressure is reached and insufficient to interfere significantly with the seating of said valve member when said fluid system pressure is reduced to a predetermined minimum level.

5. A blow-down safety valve for use with elevated temperature fluid systems and the like to open when the pressure in said fluid system reaches a predetermined maximum level, said valve including a casing formed with a generally cylindrical inlet conduit having an end face forming a valve seat, a valve member selectively movable in a direction parallel to the axis of said inlet conduit between a position seated on said valve seat and an open position spaced therefrom, said valve member having a generally flat seating portion for selective abutment with said valve seat whereby fluid exiting from said inlet conduit will flow along a first flow path portion extending generally parallel to said flat seating portion, means associated with said valve member located adjacent said seating portion thereof and beyond the periphery of said cylindrical inlet conduit for directing said exiting fluids along a second flow path portion extending generally perpendicular to the direction of said first flow path protion and along the exterior surface of said inlet conduit, and ring means mounted about said inlet conduit adjacent said valve seat thereof to form an annular chamber for receiving fluids directed along said second flow path portion, said ring means including a side wall forming the outer wall of said annular chamber, said side wall extending generally toward and beyond said valve member fluid directing means in spaced relation thereto to direct said fluid from said annular chamber in a third flow path portion extending generally opposite to said second flow path portion.

6. A blow-down safety valve as defined in claim 5 and further characterized in that said valve member fluid directing means comprises an annular lip extending from the periphery of said valve member seating portion in perpendicular relation thereto.

7. A blow-down safety valve as defined in claim 6 and further characterized in the extending length of said annular lip from said valve member seating portion is selected in relation to said maximum fluid system pressure so that the turbulence imposed upon said fluid thereby is sufficient to assist in opening said valve member sharply when said maximum fluid pressure is reached and insufficient to interfere significantly with the seating of said valve member when said fluid system pressure is reduced to a predetermined minimum level.

8. A blow-down safety valve as defined in claim 6 and further characterized in that said annular chamber includes a bottom wall extending from the exterior wall of said inlet conduit in perpendicular relation to the axis thereof, said bottom wall being located beneath said annular lip and intersecting said side wall of said annular chamber.

9. A blow-down safety valve as defined in claim 8 and further characterized in that said bottom wall and said side wall of said annular chamber intersect at a location substantially beneath the outermost periphery of said annular lip, and in that said side wall extends from said intersection in a direction toward and beyond said periphery of said annular lip in spaced relation thereto.

10. A blow-down safety valve as defined in claim 9 and further characterized in that said side wall extends from said intersection at an angle of about 108° with respect to said bottom wall.

11. A blow-down safety valve as defined in claim 9 and further characterized in that said side wall extends from said intersection at an angle which causes said spacing between said side wall and said outermost periphery of said annular lip to increase as the spacing between said annular lip and said cavity bottom wall increases.

* * * * *

UNITED STATES PATENT OFFICE
CERTIFICATE OF CORRECTION

Patent No. 4,036,250              Dated July 19, 1977

Inventor(s) James W. Dashner

It is certified that error appears in the above-identified patent and that said Letters Patent are hereby corrected as shown below:

Column 1, line 16, delete "pressrue" and insert therefor --pressure--. Column 2, line 22, delete "extend" and insert therefor --extent--; line 35, delete "aforeside" and insert therefor --aforesaid--; line 67, delete "180°" and insert therefor --108°--. Column 3, line 49, delete "casting" and insert therefor --casing--.

Column 5, line 26, delete "directed" and insert therefor --direction--; line 50, delete "qucikly" and insert therefor --quickly--; line 57, delete "valve" and insert therefor --value--; line 61, delete "it" and insert therefor --It--. Column 6, line 31, delete "extend" and insert therefor --extent--; line 35, delete "if" and insert therefor --If--; line 35, delete "extend" and insert therefor --extent--; line 52, delete "extend" and insert therefor --extent--. Column 7, lines 21 and 22, delete "extend" and insert therefor --extent--; line 38, delete "a" and insert therefor --A--; line 54, delete "deflectng" and insert therefor --deflecting--. Column 8, line 17, delete "protion" and insert therefor --portion--.

Column 2, line 9, delete "disigned" and insert therefor --designed--. Column 5, line 61, delete "set" and insert therefor --seat--.

Signed and Sealed this

Fourth Day of July 1978

[SEAL]

Attest:

RUTH C. MASON
Attesting Officer

DONALD W. BANNER
Commissioner of Patents and Trademarks